United States Patent [19]
Duguay

[11] Patent Number: 5,671,304
[45] Date of Patent: Sep. 23, 1997

[54] TWO-DIMENSIONAL OPTOELECTRONIC TUNE-SWITCH

[75] Inventor: Michel A. Duguay, Sainte-Foy, Canada

[73] Assignee: Université Laval, Quebec, Canada

[21] Appl. No.: 576,364

[22] Filed: Dec. 21, 1995

[51] Int. Cl.$^6$ ........................................ G02B 6/28
[52] U.S. Cl. ..................... 385/17; 385/16; 385/24; 385/20; 359/117; 359/115
[58] Field of Search ..................... 385/17, 16, 18, 385/19, 20, 24, 31; 359/115, 124, 139, 117

[56] References Cited

U.S. PATENT DOCUMENTS

| | | | |
|---|---|---|---|
| 4,365,863 | 12/1982 | Broussaud | 350/96.15 |
| 4,927,230 | 5/1990 | Tokumitsu | 350/96.24 |
| 5,255,332 | 10/1993 | Welch et al. | 385/17 |
| 5,283,447 | 2/1994 | Olbright et al. | 257/85 |
| 5,291,324 | 3/1994 | Hinterlong | 359/135 |
| 5,303,078 | 4/1994 | Brackett et al. | 359/139 |
| 5,315,423 | 5/1994 | Hong | 359/124 |
| 5,325,224 | 6/1994 | Lang et al. | 359/139 |
| 5,363,228 | 11/1994 | DeJule et al. | 359/117 |
| 5,369,514 | 11/1994 | Eilenberger et al. | 319/123 |
| 5,546,209 | 8/1996 | Willner et al. | 359/115 |

OTHER PUBLICATIONS

Journal of Lightwave Technology, vol. 13, No. 3, Mar. 1995, "Transmission Characteristicis of Arrayed Waveguide N ×N Wavelength Multiplexer", Hiroshi Takahasi et al, pp. 447–455.

Electronics Letters, 2nd Feb. 1995, vol. 31, No. 3, "Fabrication of 64 ×64 Arrayed–Waveguide Grating Multiplexer on Silicon" by K. Okamoto et al, pp. 184–186.

Journal of Modern Optics, 1995, vol. 42, No. 4, "A New Approach for Optimization of Wavelength Multiplexers with Phased Waveguide Arrays by Use of the Beam Propagation Method", Z. Nikolov et al, pp. 811–822 No Month.

Journal of Lightwave Technology, vol. 12, No. 6, Jun. 1994, "Wavelength Multiplexer Based on $SiO_2$–$Ta_2O_5$ Arrayed–Waveguide Grating", Hiroshi Takahashi et al, pp. 989–995.

Appl. Phys. Lett. 40(8), 15, Apr. 1982, 1982 American Institute of Physics, "Picosecond Measurement of Spontaneous and Stimulated Emission from Injection Lasers", by M.A. Duguay et al, pp. 667–669.

IEEE Photonics Technology Letters, vol. 8, No. 2, Feb. 1996, "An Optical Frequency Scale in Exact Multiples of 100 GHz for Standardization of Multifrequency Communications", Claude Gamache et al, pp. 290–292.

Proceedings from CLEO'95, "Vertical Cavity Surface Emitting Lasers 2" session, K.L. Lear, Presider, pp. 168–173, May 1995.

"Etched–Pillar Vertical–Cavity Surface–Emitting Laser Diodes with Submilliampere Threshold Currents and High Output Power", T. Wipiejewski et al, CLEO'95, pp. 55–56.

Laser World Focus, Aug. 1995, vol. 31, No. 8,, pp. 18–19.

Photonics in Switching, vol. II, "Multiwavelength Switching and Interconnection Networks", Charles A. Bracket, pp. 1–15, Academic Press, 1993 No Month.

Fiber Optic Networks, Paul E. Green, Jr., pp. 3–18 and pp. 371–373, Prentice Hall 1993 No Month.

*Primary Examiner*—Phan T. H. Palmer
*Attorney, Agent, or Firm*—Oblon, Spivak, McClelland, Maier & Neustadt, P.C.

[57] ABSTRACT

A communications switch for switching telecommunications signals from input wavelength division multiplexed (WDM) optical fibers to output WDM optical fibers is disclosed. A two-dimensional optoelectronic switch is also described which uses tunable lasers and optical diffractive elements to switch a matrix of input/output gigabaud channels without blocking. As the channels proceed through the switch they are spatially switched among one another first within rows, then within columns, and then again within rows in the matrix. The two-dimensional optoelectronic tune-switch (2DOTS) can realize the functionality of the nonblocking three-stage Clos switch for input/output ports carrying several gigabit/s data streams.

23 Claims, 2 Drawing Sheets

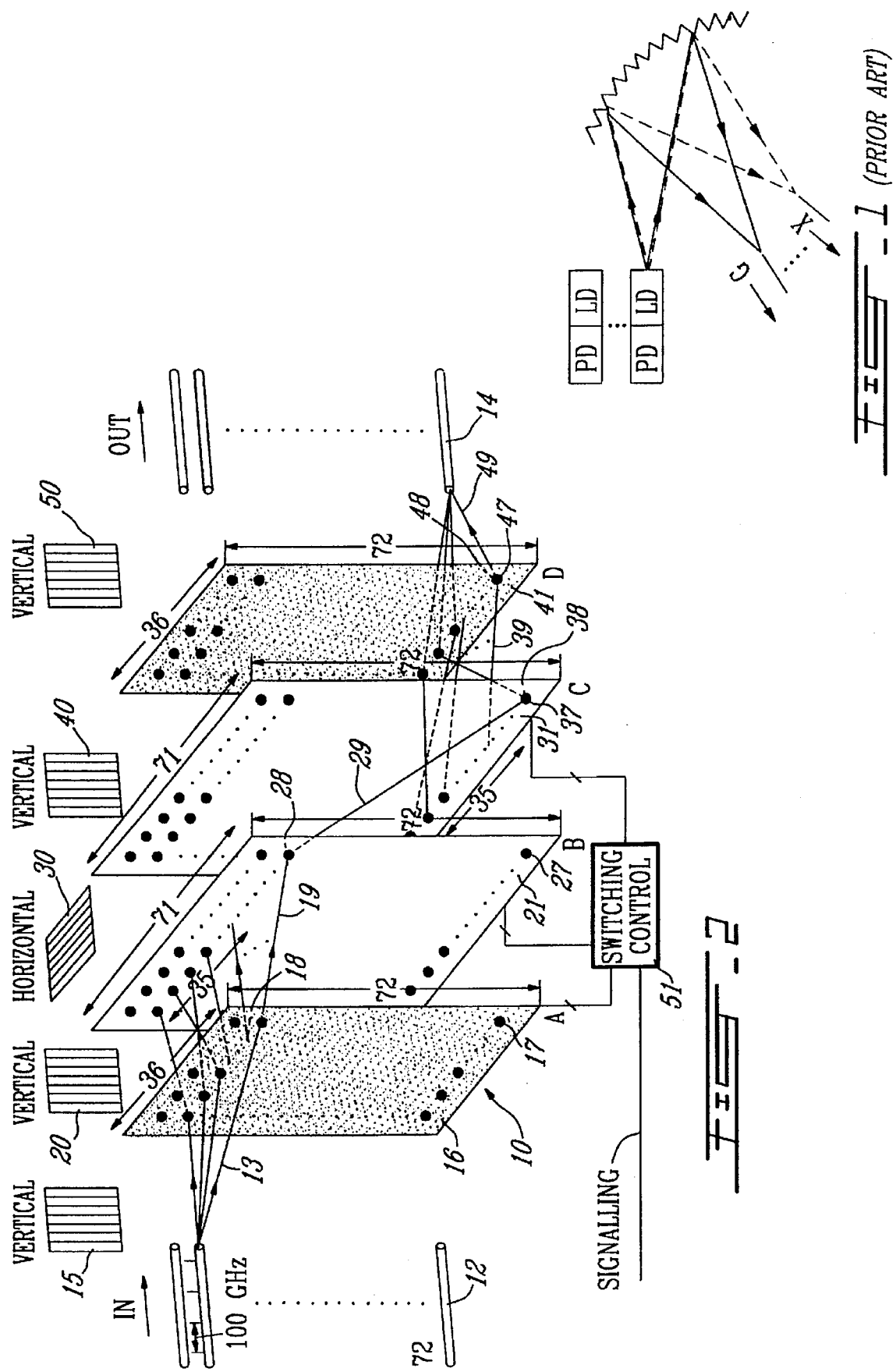

TWO-DIMENSIONAL OPTOELECTRONIC TUNE-SWITCH

FIELD OF THE INVENTION

The present invention relates to an optoelectronic communications switch for switching a two-dimensional array of input signals to a two-dimensional array of outputs, in which the switching path is selected by spatially directing light beams of intermediary optoelectronic relay stages. The invention also relates to a communications switch for switching telecommunications signals from input wavelength division multiplexed (WDM) optical fibers to output WDM optical fibers.

BACKGROUND OF THE INVENTION

As the world Of telecommunications rapidly expands its panoply of broad-band services, the need arises not only to increase transmission capacity, but also to increase the switching capacity at network switching centers. Because forward-looking scenarios call for the delivery of data streams of several gigabits per second (gigabauds) to each customer (Paul E. Green, Jr. Fiber Optic Networks, Prentice Hall, Englewood Cliffs, N.J., 1993), as compared to at most several megabits per second at present, the large increase required in switching capacity calls for dramatically improved ways of switching gigabaud data streams. Furthermore, the rapid changes which occur in network flow patterns impose the additional requirement that switching be effected in times measured in microseconds or in milliseconds.

In anticipation of this need for gigabaud switching, the optoelectronics community has been looking for more than two decades for ways of accomplishing this through the use of lasers and optics. Out of the many different techniques proposed for gigabaud switching there is one that shines by virtue of its simplicity. This is the technique whereby one accomplishes spatial switching of a laser by simply tuning its output to different wavelengths (or optical frequencies; throughout this disclosure the terms "wavelength" and "optical frequency" will be used interchangeably to characterize the optical wave, it being understood that the wavelength in vacuum is being referred to) and directing it through prisms or diffraction gratings in order to translate changes in wavelength into changes in spatial direction (Charles A. Brackett, in *Photonics in Switching*, vol. II, Edited by John E. Midwinter, Academic Press, 1993).

This is illustrated symbolically in FIG. 1 which shows a linear array of laser diodes (LD) whose outputs are coupled into a planar optical waveguide (not shown in FIG. 1, but basically coinciding with the plane of the paper), the edge of which is bounded by the curved diffraction grating symbolized by the sawtooth line. The planar waveguide confines light in the vertical direction (perpendicular to the plane of the paper in FIG. 1), while the grating diffracts incoming light rays along different angles according to their wavelengths (or optical frequencies). The grating curvature assures that the light rays are properly focused onto the output fibers. When the laser is tuned from one optical frequency f to another frequency f*, the focus of the laser light changes from, say, output fiber G to output fiber X. The properties of the diffraction grating are such that any laser in the array of input ports can be diffracted and focused into any one of the output ports (i.e. the output fibers in the case of FIG. 1) by simply tuning it to the appropriate optical frequency. Diffraction off a grating is such that in order to reach a given output fiber, say fiber X, different lasers in the linear array have to be tuned to different optical frequencies.

This type of switching by way of tuning lasers presents three great benefits: 1— it can be made nonblocking, i.e. any laser can be tune-switched into any output port regardless of what the other lasers are doing (note that if a number N of lasers are tune-switched into the same output fiber, the fiber then carries N different optical frequencies). A fundamental advantage of photons over electrons in this instance is that light streams can cross one another without interference, which is not the case with electrons; 2— the bit rate which can be accommodated with semiconductor lasers can run up to 10 Gb/s and higher; and 3— a large number of input/output ports can be tune-switched; this number falls in the range 50–1000, being approximately equal to the available tuning range, typically 10–100 nm for semiconductor lasers, divided by the convolution of the laser spectral linewidth and the spectral resolution of the grating, the value of this convolution spectral width falling typically in the range 0.1–0.2 nm. The optoelectronic tune-switch illustrated in FIG. 1 represents progress but it is limited to one-dimensional arrays of input/output ports.

A remarkable progress of optoelectronics in recent years has been the development of vertical cavity surface emission lasers (VCSEL, pronounced vecsel), so-called because their emission is perpendicular to the substrate, in contrast to conventional semiconductor lasers which emit parallel to the surface of the substrate. VCSEL lasers have now achieved (see CLEO '95, Conference on Lasers and Electro-Optics, held in Baltimore, Md., May 22–26 1995, vol. 15, 1995 *Technical Digest Series*) an extremely high performance level characterized by: 1—electrical to light conversion efficiencies of 50%, 2—lasing thresholds below 200 microamperes, 3—modulation rates up to 10 Gb/s. In addition, owing to their small dimensions (3–10 microns.), VCSELs can be fabricated with excellent yields by the hundreds of thousands on one planar substrate 50 to 75 mm in diameter. As a consequence, it is expected that the cost of these lasers will follow the same curve as transistors and plunge to the level of cents per laser.

Another recent and important advance in VCSEL technology is progress in tuning them over wide bands. Workers at Stanford University announced earlier this year a new electro-mechanical structure whereby integrated micromirrors can tune a VCSEL over a range of 15 nm (*Laser Focus World*, August 1995, vol. 31, p. 18). This tuning can be effected in a time on the order of one microsecond. With an optical channel spacing of 100 GHz in optical frequency (0.21 nm in the 800 nm band) this 15 nm tuning range would allow one to tune-switch a laser into approximately 72 different output ports in one dimension.

SUMMARY OF THE INVENTION

In the present invention, a two-dimensional optoelectronic tune-switch (2DOTS) implements tune-switching for two-dimensional arrays of input/output ports. Two important benefits result from going over to two-dimensional switching: 1—the number of channels will now be on the order of the square of the number of channels possible in the one-dimensional case, and 2—signals entering the switch on one wavelength on an input fiber can be switched over to another wavelength on an output fiber. The 2DOTS switch could potentially switch thousands to tens of thousands of gigabaud channels without blocking and thus be extremely useful in telecommunications networks.

According to the invention, there is provided a communications switch comprising a first two-dimensional array of lasers repeating signals from an array of n horizontal rows by m vertical columns of input electrical signals, a first two-dimensional array of n horizontal rows by m' vertical columns of photodetectors receiving light from the first lasers, first controllable means for spatially directing light from each member of each horizontal row of the first array of lasers onto a member of the corresponding horizontal row of the first array of photodetectors, light being switched only horizontally between columns in same rows, a second two-dimensional array of n horizontal rows by m' vertical columns of lasers repeating signals from the first photodetectors, a second two-dimensional array of n' horizontal rows by m' vertical columns of photodetectors receiving light from the second lasers, second controllable means for spatially directing light from each member of each vertical column of the second array of lasers onto a member of the corresponding vertical column of the second array of photodetectors, light being switched only vertically between rows in same columns, a third two-dimensional array of n' horizontal rows by m' vertical columns of lasers repeating signals from the second photodetectors, a third two-dimensional array of n' horizontal rows by m" vertical columns of photodetectors receiving light from the third lasers and generating output electrical signals, third controllable means for spatially directing light from each member of each horizontal row of the third array of lasers onto a member of each corresponding horizontal row of the third array of photodetectors, light being switched only horizontally between columns in same rows, and switch control means connected to the first, second and third controllable means for establishing a switching path through the switch connecting the input signals to selected ones of the third array of photodetectors. In this way, n by m input signals can be switched to n' by m" output signals.

As we will see in one example given below, using tunable VCSEL arrays to tune-switch in two dimensions allows one to build a non-blocking switch capable of handling 2,592 channels each carrying several Gb/s.

The invention also provides a communications switch for switching telecommunications signals from input wavelength division multiplexed (WDM) optical fibers to output WDM optical fibers, comprising an input array of n horizontal rows by m vertical columns of photodetectors generating switch input electrical signals, an input wavelength sensitive directing means for directing light from an n-dimensioned linear array of input multi-wavelength optical fibers each carrying m channels to the input array of photodetectors, switching means for controllably switching the input signals to selected ones of an array of o horizontal rows by p vertical columns of electrical outputs, an output array of o horizontal rows by p vertical columns of lasers each repeating one of the electrical outputs, the lasers comprising rows of o lasers each operating at one of p different optical frequencies, and an output wavelength sensitive directing means for directing light from the output array of lasers to an o- dimensioned linear array of output multi-wavelength optical fibers carrying p channels. In this way, any WDM communications signal on any input fiber can be switched to any optical frequency channel on any output fiber. The switching means may comprise an optoelectronic switching arrangement as referred to above, or alternatively an electronic telecommunications switch as is known in the art may be implemented.

BRIEF DESCRIPTION OF THE DRAWINGS

The invention will be better understood by following the non-limiting detailed description of the preferred embodiment with reference to the drawings in which:

FIG. 1 is a symbolic representation of a prior art diffractive circuit to separate out different optical frequencies emitted by each laser in an array and focus them onto different output ports (fibers labeled G and X in this example);

FIG. 2 is a symbolic representation of the 2DOTS switch according to the preferred embodiment, the rectangles with vertical lines symbolize the diffraction of laser beams within horizontal planes, and the rectangle with horizontal lines symbolizes diffraction of light within vertical planes; the rectangles labeled A, B, C and D are rectangular arrays of optoelectronic micro-repeaters, each one of which being located in the microscopic region represented by a black dot;

DETAILED DESCRIPTION OF THE PREFERRED EMBODIMENT

Figure 3:
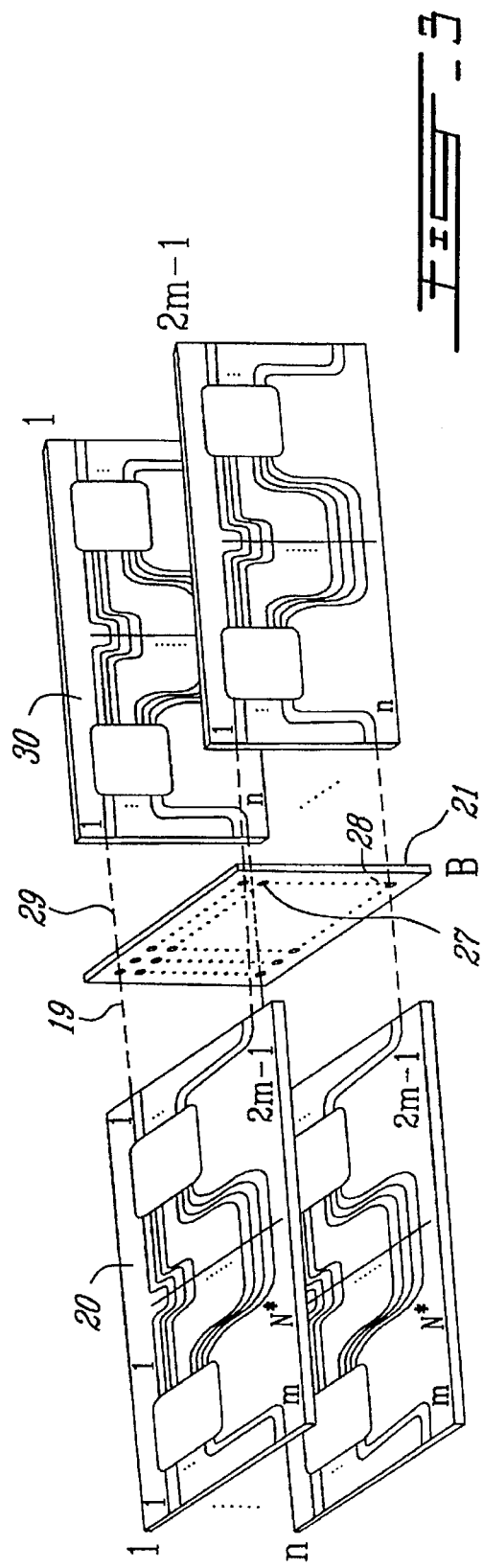
FIG. 3 is a symbolic representation of two stacks of AWGs 20 and 30 (AWG stands for Arrayed Waveguide Grating) to fulfill the diffractive functions symbolized in FIG. 2 by the vertical line rectangle 20 and by the horizontal line rectangle 30, respectively.

A 2DOTS switch 10 is illustrated in FIG. 2. In the preferred embodiment chosen to illustrate the operation of the system, there is shown on the entrance side a column of 72 optical fibers 12 each carrying 36 optical frequencies spaced 100 GHz apart. We have here a two-dimensional array of 72×36 channels in the sense that one dimension is spatial and the second is spectral (or frequency). The 100 GHz frequency interval between channels corresponds to a wavelength interval of 0.8 nm in the 1550 nm band, 0.564 nm in the 1300 nm band, and about 0.21 nm in the 800 nm band. The 100 GHz channel spacing is currently being considered as a potential standard for wavelength division multiplexed (WDM) systems. It is used here for that reason and also because it can be implemented with state of the art diffractive devices.

The outputs from the 72 fibers are diffractively split by device 15 (or demultiplexed) onto a 72 by 36 matrix of photodetectors (located at the black dots in FIGS. 2 and 3) which is part of an optoelectronic integrated circuit symbolically represented by the rectangle labeled A in FIG. 2. As a result of diffraction each one of the 36 optical frequencies in one given fiber (the outputs from the second input row are illustrated in FIG. 2) is focused onto its corresponding photodetector 17 (17 is a collective label for all the photodetectors in the optoelectronic micro-repeater array located in rectangle A) in the row corresponding to that fiber. In the plane of rectangle A (referred to as plane A hereafter; likewise for rectangles B, C, and D) a two-dimensional array of channels in the fully spatial sense is provided.

The diffractive means employed for this channel demultiplexing operation are symbolized in FIG. 2 by what appears like a grating with vertical lines near the input column. The actual implementation of the diffractive means could be one of three kinds. As a first possibility we could have at each level a diffractive planar waveguide device of the type illustrated in FIG. 1. Ideally these would be made approximately 125 microns in total thickness and would have a light-guiding core layer that matches the mode size of standard single-mode optical communications fibers.

They could then be stacked like a pile of coins, with great attention being paid to having their inputs well aligned with the input fiber cores. The 125-micron thickness of the diffractive circuits would facilitate the alignment of the light-guiding core layers with the cores of the standard communications fibers whose cladding diameter is 125 microns. The diffractive circuits of the type illustrated in FIG. 1 would have input and output waveguides photo-lithographically fabricated on the integrated optic diffractive chip in order to facilitate the input/output light coupling requirements. It is these input waveguides that one would line up with the input fiber cores.

On the output side of the diffractive means 15 at plane A the 72 by 36 matrix of optical beams either could be made to couple directly (through so-called "proximity focusing") into the photodetector matrix at plane A, or it could be imaged onto the photodetector matrix through the use of suitable optics. In the case of proximity focusing, the output waveguides of the diffractive integrated optic circuit would be brought very close to (typically within 10 micrometers) and aligned with the photodiodes located at the black dots of the rectangular array A of optoelectronic micro-repeaters.

The second possibility for the diffractive means is the preferred embodiment. In this preferred embodiment, the diffractive elements 20, 30, 40 and 50 as shown in FIG. 2 actually comprise stacks of so-called Arrayed Waveguide Gratings (AWG) which have been developed extensively in recent years for WDM applications (see: H. Takahashi, S. Suzuki, and I. Nishi, "Wavelength multiplexer based on $SiO_2$-$Ta_2O_5$ arrayed-waveguide grating", *J. Lightwave Technology*, vol. 12, pp. 989–995, 1994; Z. Nikolov and H. G. Unger, "A new approach for optimization of wavelength multiplexers with phased waveguide arrays by use of the beam propagation method", *J. Modern Optics*, vol. 42, pp. 811–822, 1995; and K. Okamoto, K. Moriwaki and S. Suzuki, "Fabrication of 64×64 arrayed-waveguide grating multiplexer on silicon", *Electronics Letters*, vol. 31, pp. 184–86, 1995). These AWGs are illustrated in FIG. 3 which also shows schematically how they would be stacked and coupled in and out of the VCSEL matrixes.

Each AWG in AWG stack 20 in FIG. 3, consists of an input N by N* star coupler (N and N* are integers, with N* often 10 times larger than N) joined to an output N* by M star coupler by a linear array of N* progressively longer waveguides (for AWGs 20 in FIG. 3, N equals m which is numerically 36 in the example of FIG. 2, and M equals (2m−1) which is numerically 71 in the example of FIG. 2; for AWGs 30, both N and M equal n which is equal to 72 in the example of FIG. 2. The arrayed waveguides are designed and adjusted so that the AWG realizes a functionality akin to that of a diffraction grating. In a suitably designed AWG, light at frequency f (taken from the 100 GHz comb, for example) injected into one of the N input ports will couple into one of the M output ports. Light from the next "tooth" on the frequency comb will couple out of the next adjacent port, and so on. It is to be noted that the last AWG port M in FIG. 3 is adjacent in the optical frequency sense to the first port 1. In other words, if one changes the frequency of light continuously so that light exits ascending port numbers in FIG. 3, then the port reached after port M will be port 1 again. The device works sort of "modulo M" in mathematical terminology. This property means that each tunable semiconductor laser 18 in the array can cover the same spectral tuning range and be able to reach any output port 27 that is at the same height. As before with edge-grating diffractive circuits (FIG. 1), the AWG diffractive circuits would ideally be made to be approximately 125 microns thick and be stacked like a pile of coins in such a way that the input and output lightguides on each AWG are aligned with the corresponding microrepeaters in the optoelectronic repeater arrays symbolized by rectangles A, B, C, and D in FIG. 2.

A third possibility for the diffractive means would be to use a modification of the well-known spectrograph where the input fiber column would be made to coincide with the spectrograph's entrance slit. Suitable focusing optics in the spectrograph would then collimate the 72 laser beams 13, direct them to a large bulk grating 15 (say 10 by 10 cm) which would then diffract the beams so that they could be focused onto the photodetector matrix 17 in plane A. The photodetector matrix would coincide with the spectrograph's output focal plane, the place where photographic plates traditionally record optical spectra.

After this frequency to space demultiplexing effected by diffractive means 15, there takes place in the optoelectronic rectangular array A the first step in tune-switching. In the integrated optoelectronic circuit symbolized by rectangle A, the black dots are meant to represent a photodetector (PD) 17 on the left side of the plane which is closely coupled through suitable electronics to a tunable VCSEL laser diode (LD) 18 on the right side of the plane (this is expressed symbolically by the small rectangles labeled PD/LD in FIG. 1).

Each black dot in optoelectronic plane A basically represents what is known in communications as a repeater (physically, a microrepeater here), with one crucial difference, however. The microrepeater electronics processing the optical signal coming in from the left must drive the laser on the right not only according to the instantaneous power in the incoming light but they must also tune the laser according to the switching instructions. The optical signal can be a digital signal or an analog signal. The switching instructions can be provided by the local switch control computer 51 that runs the 2DOTS. In the case of the Stanford VCSELs, the optical frequency is controlled by the voltage level of a control signal, and the switch control computer includes a digital to analog converter (DAC) for generating a variable voltage signal (switching instruction) for each VCSEL 18, 28, 38 and 48 in the matrices of tunable lasers. The instructions are used to tune the laser 18 to an optical frequency that will diffractively direct the optical signal to a suitably chosen column at optoelectronic plane B. The nature of the diffractive means between planes A and B can be the same as we described earlier for the entrance section before plane A. The important thing to note is that the channels can only be switched among one another within rows in going from A to B; in other words a given channel will only switch columns between A and B.

One structural difference between optoelectronic planes A and B is the number of columns. In order to avoid blocking, there is provided in accordance with the design principle of a three-stage Clos switch at least 71 columns to switch to from plane A. Set out below is the strategy followed by the last user in the second entrance row in order to reach his chosen destination, the third column of the 72nd row at plane D. Of course, it is possible to provide a few spare columns to compensate for the case when a photodiode or a VCSEL laser fails, and thus it may be desirable to provide more than 71 (or 2m−1) columns. Of course once a photodiode or laser is determined to be non-functional, the switching control computer program needs to remember to avoid the failed device. This can be easily achieved in software and allows the 2DOTS to be made using integrated devices which may include a small percentage of bad components.

Between planes B and C the channels are tune-switched only within columns, in other words they change rows. In order to accomplish this the diffractive means between B and C need to operate at 90 degrees relative to the entrance (and exit) stages. The symbolic representation of a diffraction grating with horizontally scribed lines indicates that laser beams are now tune-switched along the vertical. Between B and C a channel entering at one height (second row level in FIG. 2) is now tune-switched to the chosen exit height (72nd or bottom row in FIG. 2).

The diffractive means to achieve tune-switching between B and C are the same as in the preceding step except that everything is turned around by 90 degrees. If diffractive planar waveguide devices 125-micron thick were to be stacked, each one would occupy a vertical plane along the corresponding column between B and C. FIG. 3 illustrates the preferred embodiment with diffractive circuits of the AWG type. As before a structure built like the traditional spectrograph could be used for diffraction and focusing between B and C, but again this spectrograph would have to be turned 90 degrees with respect to its usual position so that its grating would have its lines parallel to the horizontal plane.

Between C and D much the same thing occurs as between A and B. At this stage the output destination column is selected and tune-switched to. Between D and the output fiber column, the reverse of what happened between the input fiber column and plane A takes place. More specifically, the lasers in optoelectronic repeater array D' are tuned so that their outputs are directed into the output optical fibers via the diffractive means.

As an example, the switching method followed by the second entrance row's last user will be described. In the worst possible blocking case, the links from C to D to all 35 neighbors of his chosen destination are occupied and are moreover part of end-to-end paths comprising links between B and C which are not the same as the end-to-end paths comprising the 35 links occupied between A and B by all 35 second row neighbors at optoelectronic plane A. This means that 70 links are occupied between B and C. The 71st column at B and C is, however, left free and it permits the last user to reach his chosen destination (assumed to be free) in the third column of the 72nd row.

The number of channels used in the example above was chosen conservatively on the basis of the available 15 nm bandwidth of the Stanford University VCSEL matrix. With this type of laser operated near 800 nm, a 100 GHz channel spacing corresponds to a wavelength spacing of 0.21 nm. This spacing is enough to accommodate the spectral linewidth of lasers modulated at several Gb/s, due account being taken of chirping effects which tend to increase the laser linewidth beyond the bit rate requirement. In previous work with conventional semiconductor lasers driven by 90 picosecond pulses, laser linewidths and grating resolution were compatible with 100-GHz channel spacings (see M. A. Duguay and T. C. Damen, "Picosecond measurements of spontaneous and stimulated emission from injection lasers", *Applied Physics Letters*, vol. 40, pp. 667–669, 1982). Diffraction off a grating can broaden a laser pulse temporally; this effect must be taken into account in the design of the diffractive element, especially at the highest bit rates contemplated, namely 10 Gb/s.

Figure 4:
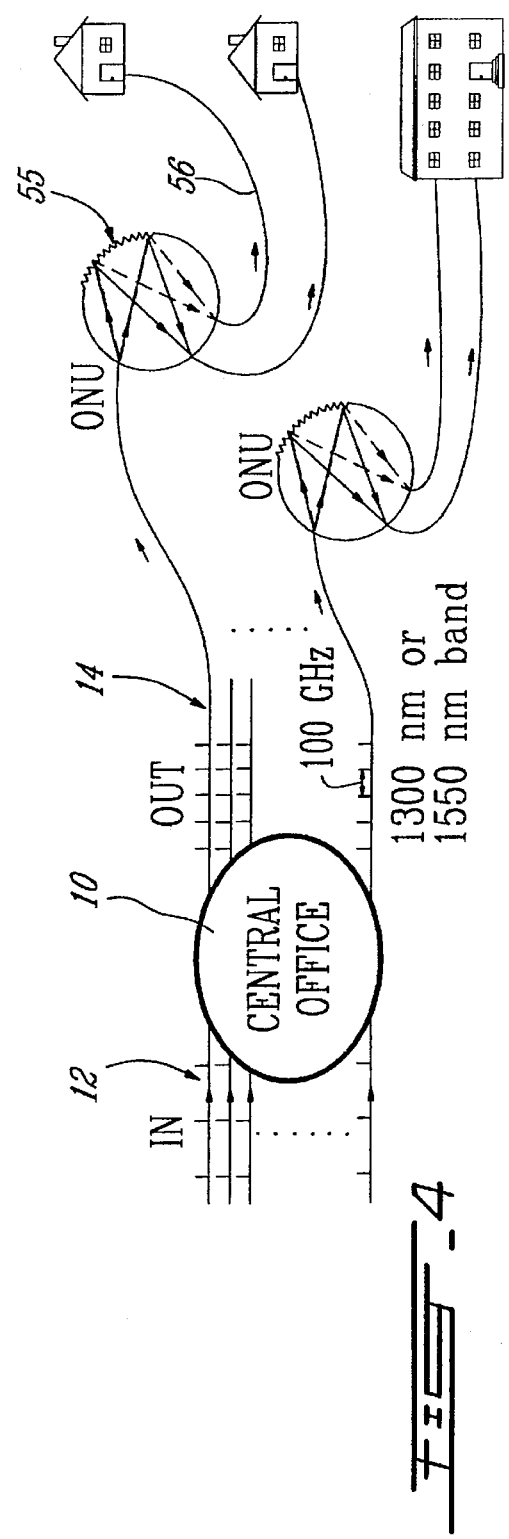
FIG. 4 is a schematic diagram of an example of the use of a 2DOTS switch to connect houses and office buildings via a central office and optical network units (ONU) in which the ONUs are entirely passive diffractive circuits such as planar waveguides with edge-mounted gratings (as in FIG. 1) or, such as AWGs.

Finally, in FIG. 4, it is shown how the 2DOTS switch placed in a central office could be used to switch a number of input lines to a number of output lines going to houses and office buildings. A second fiber-switch system could assure information flow in the reverse direction.

As can be appreciated, at each optoelectronic plane A, B, or C, the semiconductor materials can be different, i.e. the spectrum of wavelengths used can be different at each plane since each laser beam emitted at one plane is detected at the next. The optoelectronic matrix of lasers can also be tailored so that each laser tunes over the optimum spectral region given the diffractive elements that it couples to. With a stack of AWGs each laser in the matrix will be tuned over the same spectral range, a feature which simplifies manufacturing of the VCSEL array.

It is important to note that the input photodiode matrix in optoelectronic plane A could alternatively be changed to a matrix of purely electronic inputs. Similarly the output laser matrix on the right side of plane D could be changed to purely electronic output drivers. In this case the 2DOTS would be switching two-dimensional arrays of electronic channels. 2DOTS is therefore applicable to a purely electronic as well as to an optical environment.

I claim:

1. A communications switch comprising:

a first two-dimensional array of lasers repeating signals from an array of n horizontal rows by m vertical columns of input electrical signals;

a first two-dimensional array of n horizontal rows by m' vertical columns of photodetectors receiving light from said first lasers;

first controllable means for spatially directing said light from each member of each horizontal row of said first array of lasers onto a member of the corresponding horizontal row of said first array of photodetectors, said light being switched only horizontally between columns in same rows;

a second two-dimensional array of n horizontal rows by m' vertical columns of lasers repeating signals from said first photodetectors;

a second two-dimensional array of n' horizontal rows by m' vertical columns of photodetectors receiving light from said second lasers;

second controllable means for spatially directing said light from each member of each vertical column of said second array of lasers onto a member of the corresponding vertical column of said second array of photodetectors, said light being switched only vertically between rows in same columns;

a third two-dimensional array of n' horizontal rows by m' vertical columns of lasers repeating signals from said second photodetectors;

a third two-dimensional array of n' horizontal rows by m" vertical columns of photodetectors receiving light from said third lasers and generating output electrical signals;

third controllable means for spatially directing said light from each member of each horizontal row of said third array of lasers onto a member of each corresponding horizontal row of said third array of photodetectors, said light being switched only horizontally between columns in same rows; and switch control means connected to said first, second and third controllable means for establishing a switching path through said switch connecting said input signals to selected ones of said third array of photodetectors, whereby n by m input signals can be switched to n' by m" output signals.

2. The switch as claimed in claim 1, wherein said first, second and third arrays of lasers are wavelength tunable, and said first, second and third controllable means comprise wavelength sensitive directing means and tuning means for setting the wavelength of all lasers in use to switch said input signals to said output receivers.

3. The switch as claimed in claim 2, wherein said wavelength sensitive directing means comprise diffractive means.

4. The switch as claimed in claim 3, wherein said diffractive means comprise Arrayed Waveguide Gratings (AWGs).

5. The switch as claimed in claim 4, wherein said first, second and third arrays of lasers are provided on first, second and third substrates respectively, and said first, second and third arrays of photodetectors are mounted on said second substrate, said third substrate and a fourth substrate respectively, said substrates being separate, spaced apart, substantially parallel and mounted in a same housing, said lasers on said second and third substrates being connected to only one of said photodetectors on an opposite side of said second and third substrates.

6. The switch as claimed in claim 5, wherein each one of said lasers on said second and third substrates is connected to only one of said photodetectors located substantially at a same position on an opposite side of said second and third substrates.

7. The switch as claimed in claim 5, wherein said AWGs are mounted perpendicularly to said substrates, said AWGs located between said first and second substrates and between said third and fourth substrate being horizontally disposed, and said AWGs located between said second and third substrates being vertically disposed.

8. The switch as claimed in claim 1, further comprising an input array of n by m photodetectors generating said input signals, and input wavelength sensitive directing means for directing light from an n-dimensioned linear array of optical fibers each carrying a comb of m wavelength division multiplexed (WDM) optical signals such that each one of said input array of photodetectors receives an optical signal.

9. The switch as claimed in claim 8 further comprising an output array of n' by m" tunable lasers repeating said electrical outputs, and output wavelength sensitive directing means for directing light from said output array of lasers to an n'-dimensioned linear array of fibers each carrying a comb of m wavelength division multiplexed (WDM) optical signals such that each one of said output array of tunable lasers generates one WDM channel on said fibers.

10. The switch as claimed in claim 9, wherein said directing means comprise Arrayed Waveguide Gratings (AWGs).

11. The switch as claimed in claim 8, wherein directing means comprise Arrayed Waveguide Gratings (AWGs).

12. The switch as claimed in claim 2, wherein said first, second and third arrays of lasers are provided on first, second and third substrates respectively, and said first, second and third arrays of photodetectors are mounted on said second substrate, said third substrate and a fourth substrate respectively, said substrates being separate, spaced apart, substantially parallel and mounted in a same housing, said lasers on said second and third substrates being connected to only one of said photodetectors on an opposite side of said second and third substrates.

13. The switch as claimed in claim 12, wherein each one of said lasers on said second and third substrates is connected to only one of said photodetectors located substantially at a same position on an opposite side of said second and third substrates.

14. The switch as claimed in claim 12, wherein said lasers comprise VCSEL (vertical cavity surface emission laser) devices.

15. The switch as claimed in claim 2, wherein said lasers comprise VCSEL (vertical cavity surface emission laser) devices.

16. The switch as claimed in claim 1, further comprising an output array of n' by m" tunable lasers repeating said electrical outputs, and output wavelength sensitive directing means for directing light from said output array of lasers to an n'-dimensioned linear array of fibers each carrying a comb of m wavelength division multiplexed (WDM) optical signals such that each one of said output array of tunable lasers generates one WDM channel on said fibers.

17. The switch as claimed in claim 16, wherein said directing means comprise Arrayed Waveguide Gratings (AWGs).

18. The switch as claimed in claim 1, wherein said first, second and third arrays of lasers are provided on first, second and third substrates respectively, and said first, second and third arrays of photodetectors are mounted on said second substrate, said third substrate and a fourth substrate respectively, said substrates being separate, spaced apart, substantially parallel and mounted in a same housing, said lasers on said second and third substrates being connected to only one of said photodetectors on an opposite side of said second and third substrates.

19. The switch as claimed in claim 18, wherein each one of said lasers on said second and third substrates is connected to only one of said photodetectors located substantially at a same position on an opposite side of said second and third substrates.

20. The Switch as claimed in claim 1, wherein m' is at least (2m−1), n is equal to n', and m" is equal to m, whereby said switch is non-blocking and has a same number of inputs as outputs.

21. A communications switch for switching telecommunications signals from input wavelength division multiplexed (WDM) optical fibers to output WDM optical fibers, the switch comprising:

an input array of n horizontal rows by m vertical columns of photodetectors generating switch input electrical signals;

an input wavelength sensitive directing means for directing light from an n- dimensioned linear array of input multi-wavelength optical fibers each carrying m channels to said input array of photodetectors;

switching means for controllably switching said input signals to selected ones of an array of o horizontal rows by p vertical columns of electrical outputs;

an output array of o horizontal rows by p vertical columns of lasers each repeating one of said electrical outputs, said lasers comprising rows of o lasers each operating at one of p different optical frequencies; and an output wavelength sensitive directing means for directing light from said output array of lasers to an o-dimensioned linear array of output multi-wavelength optical fibers each carrying p channels, whereby any WDM communications signal on any input fiber can be switched to any optical frequency channel on any output fiber.

22. The switch as claimed in claim 21, wherein said input and said output directing means comprise Arrayed Waveguide Gratings (AWGs).

23. The switch as claimed in claim 21, wherein a product of n by m is equal to a product of o by p, and said switching means is non-blocking.

* * * * *